United States Patent
Doerr (10) Patent No.: US 7,330,659 B2
(45) Date of Patent: Feb. 12, 2008

(54) WAVELENGTH FILTER THAT OPERATES ON SETS OF WAVELENGTH CHANNELS

(75) Inventor: Christopher Richard Doerr, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1299 days.

(21) Appl. No.: 09/798,501

(22) Filed: Mar. 2, 2001

(65) Prior Publication Data

US 2002/0122440 A1    Sep. 5, 2002

(51) Int. Cl.
    *H04J 14/02*    (2006.01)
(52) U.S. Cl. .......................... 398/87; 359/559; 385/37
(58) Field of Classification Search ................. 398/83, 398/84, 87; 359/569; 385/24, 37
    See application file for complete search history.

(56) References Cited

U.S. PATENT DOCUMENTS

| | | | | |
|---|---|---|---|---|
| 5,444,725 A | * | 8/1995 | Zirngibl | 372/20 |
| 5,680,450 A | | 10/1997 | Dent et al. | 379/388 |
| 5,680,490 A | * | 10/1997 | Cohen et al. | 385/24 |
| 5,960,133 A | * | 9/1999 | Tomlinson | 385/18 |
| 6,035,080 A | * | 3/2000 | Henry et al. | 385/24 |
| 6,212,315 B1 | * | 4/2001 | Doerr | 385/31 |
| 6,271,949 B1 | * | 8/2001 | Suemura et al. | 398/9 |
| 6,381,059 B1 | * | 4/2002 | Carlson | 359/244 |
| 6,545,783 B1 | * | 4/2003 | Wu et al. | 398/83 |
| 6,697,574 B2 | * | 2/2004 | Frigo et al. | 398/71 |
| 6,744,986 B1 | * | 6/2004 | Vohra | 398/83 |

FOREIGN PATENT DOCUMENTS

EP    EP 1 030 480 A2    2/2000

* cited by examiner

*Primary Examiner*—Leslie Pascal (57) ABSTRACT

A wavelength filter, for filtering a WDM signal, comprises a demultiplexer, a multiplexer, and a control array connecting the demultiplexer and the multiplexer, where the demultiplexer and the multiplexer have a free spectral range (FSR) smaller than their wavelength channel span.

4 Claims, 9 Drawing Sheets

POSITION IN A STAR COUPLER IN A PLANAR
WAVEGUIDE GRATING

WAVELENGTH FILTER THAT OPERATES ON SETS OF WAVELENGTH CHANNELS

FIELD OF THE INVENTION

This invention relates to Wavelength-division Multiplex systems and, more particularly to wavelength filters.

BACKGROUND OF THE INVENTION

A wavelength-division multiplexing (WDM) technique is one that combines (multiplexes) signals at different wavelengths to travel through the same optical fiber. The resulting signal is called a WDM signal and each wavelength of the WDM signal is called a wavelength channel (hereinafter "channel"). A WDM communication system is one that employs the WDM technique. For example, an optical communication system that comprises two nodes—one equipped with a wavelength-division multiplexer and the other, a demultiplexer—is a WDM communication system. Generally, the wavelength-division multiplexer multiplexes several single-wavelength signals into a WDM signal for transmitting through a single optical fiber to the demultiplexer, which demultiplexs the WDM signal back to several single-wavelength signals. However, a more complicated WDM communication system may provide blocking and/or add/drop capability in its nodes. The device that provides the blocking capability is called a wavelength blocker and enables a node to remove signals in some or all channels. The device that provides the add/drop capability is called a wavelength add/drop multiplexer (WAD) and allows a node to drop signals to other nodes or end users, add signals from other nodes or end users, or pass some or all input signals to the next node. Wavelength-division multiplexers and demultiplexers, WADs and wavelength blockers are examples of wavelength filters that "filter" signals in channels of a WDM signal.

As the demand for optical bandwidth increases in a WDM communication system, it is desirable to increase the number of channels. Unfortunately, this increases the size, the cost, and the insertion loss of these wavelength filters.

SUMMARY OF THE INVENTION

In accordance with the principles of the invention, the above problem can be better addressed by having a wavelength filter that operates on sets of channels. In particular, a wavelength filter, for filtering a WDM signal, comprises a demultiplexer, a multiplexer, and a control array coupling the demultiplexer to the multiplexer, where at least one element of the control array operates on more than one channel of the WDM signal.

An embodiment of the invention is a wavelength filter, for filtering a WDM signal, that comprises a demultiplexer, a multiplexer, and a control array coupling the demultiplexer to the multiplexer, where the demultiplexer and the multiplexer each comprises a grating having a free spectral range (FSR) smaller than the wavelength channel span. When the FSR is smaller than the wavelength channel span, wavelength channels of the WDM signal are operated on in sets by the control array. This generally reduces the minimum required physical size of the wavelength filter.

BRIEF DESCRIPTION OF THE DRAWINGS

The present invention will be more fully appreciated from a consideration of the following Detailed Description, which should be read in light of the accompanying drawings in which.

DETAILED DESCRIPTION

Figure 1:
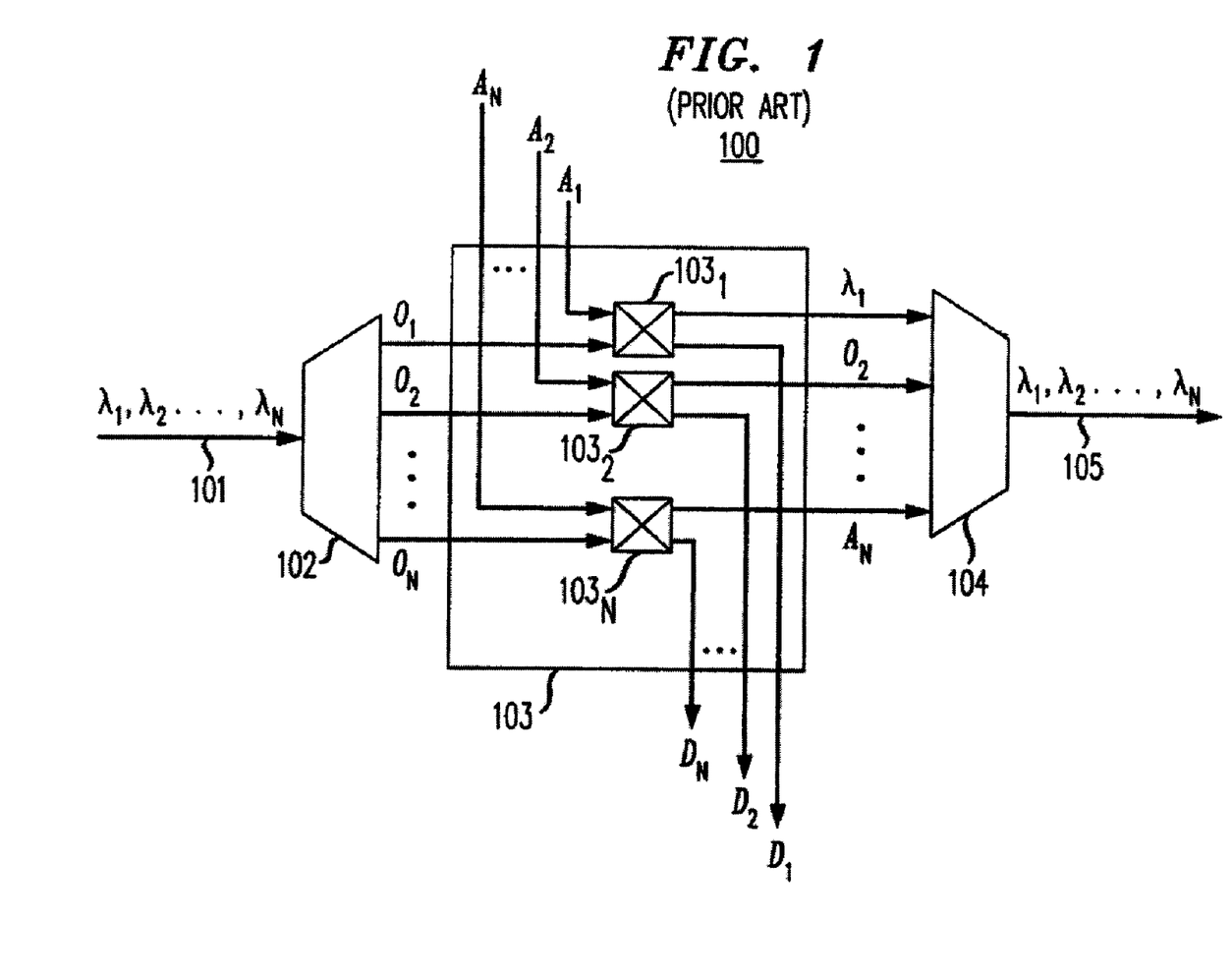
FIG. 1 shows a typical prior art wavelength add/drop multiplexer.

As stated earlier, wavelength add/drop multiplexers (WADs) are key components of a WDM communication system. To help readers appreciate the invention, a typical configuration of a prior art WAD is illustrated in FIG. 1. WAD 100 comprises demultiplexer 102, control array 103, and multipelxer 104. Demultiplexer 102 demultiplexes WDM signal 101 having N channels ($\lambda_1 \lambda_2 \ldots \lambda_N$) into N demultiplexer output signals $O_1$-$O_N$. Each demultiplexer output signal is associated with a particular channel. For example, demultiplexer output signal $O_1$ is associated with the channel of wavelength $\lambda_1$. Control array 103 provides the add/drop function and comprises a plurality of control elements $103_1$-$103_N$. Each control element controls a channel. Each control element receives a demultiplexer output signal and an add signal, and provides a control array output signal and a drop signal, all associated with the same channel. For example, control element $103_1$ controls the channel of wavelength $\lambda_1$, and it receives demultiplexer output signal $O_1$ and add signal $A_1$, and provides drop signal $D_1$ and a control array output signal, all associated with the channel of wavelength $\lambda_1$. The following scenarios will help readers understand the function of a control element. First, a control element may be operated to provide the received demultiplexer output signal as the control array output signal. In this scenario, the control element ignores the received add signal and does not provide a drop signal. Second, the control element may be operated to provide the received add signal as the control array output signal. In this scenario, the control element either does not provide a drop signal, or provides the received demultiplexer output signal as the drop signal. Finally, the control element may be operated to provide the received demultiplexer output signal as the drop signal. In this scenario, the control element either does not provide a control array output signal, or provides the received add signal as the control array output signal. For illustration purposes, WAD 100 provides two add signals, $A_1$ and $A_N$, and N–2 demultiplexer output signals, $O_2$-$O_{N-1}$, as the control array output signals shown in FIG. 1. Multiplexer 104 multiplexes the control array output signals to generate output WDM signal 105 having N channels ($\lambda_1 \lambda_2 \ldots \lambda_N$).

Generally, demultiplexer 102 and multiplexer 104 are implemented with gratings such as planar waveguide gratings or free-space diffraction gratings (described below). The planar waveguide gratings are also called arrayed waveguide gratings or planar refraction gratings. If planar waveguide gratings are used for demultiplexer 102 and multiplexer 104, control array 103 also comprises a plurality of equal-length waveguides (not shown) in addition to control elements $103_1$-$103_N$. Each equal-length waveguide is associated with a different control element. (Note that two waveguides are viewed to be "equal-length" if their lengths are within a few wavelengths difference to each other.) Control elements $103_1$-$103_N$ generally are switches, preferably Mach-Zehner switches. If free-space diffraction gratings are used for demultiplexer 102 and multiplexer 104, control array 103 does not comprise equal-length waveguides, and control elements $103_1$-$103_N$, generally, are free-space control elements, such as MEMS mirrors or liquid crystals.

Figure 2:
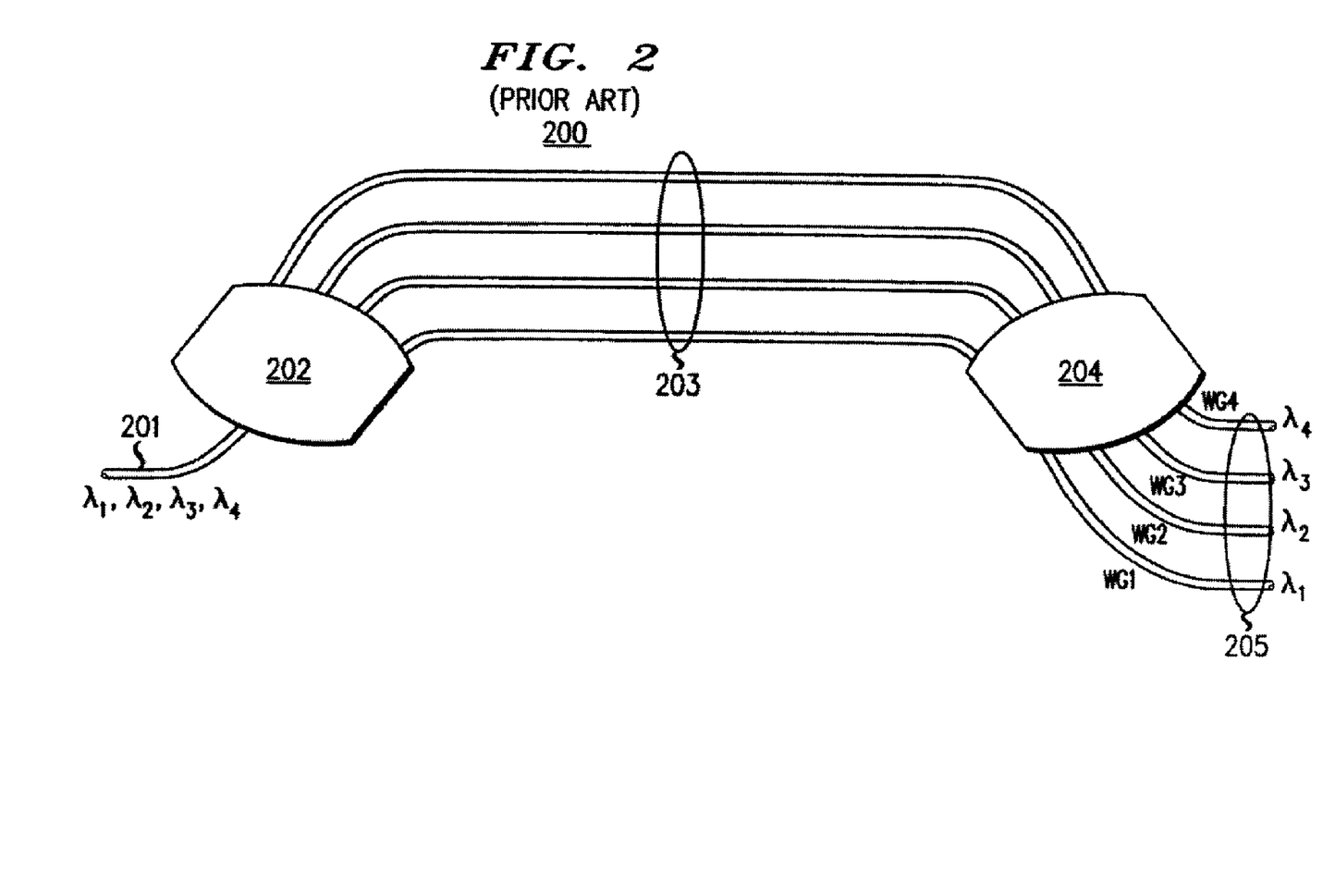
FIG. 2 shows a typical prior art planar waveguide grating.

FIG. 2 shows a prior art planar waveguide grating used as a demultiplexer. This grating can be used as a demultiplexer if an input WDM signal is applied at waveguide 201, or a multiplexer (not described here) if multiple single wavelength signals are applied at waveguide array 205. Demultiplexer 200 comprises two star couplers, 202 and 204, and grating arm array 203. Demultiplexer 200 receives a WDM signal having four channels ($\lambda_1 \lambda_2 \lambda_3 \lambda_4$) from waveguide 201 and produces four demultiplexer output signals at waveguide array 205, which includes four waveguides, WG1, WG2, WG3, and WG4, which in turn carry demultiplexer output signals of wavelengths, $\lambda_1$, $\lambda_2$, $\lambda_3$, and $\lambda_4$, respectively.

Figure 3:
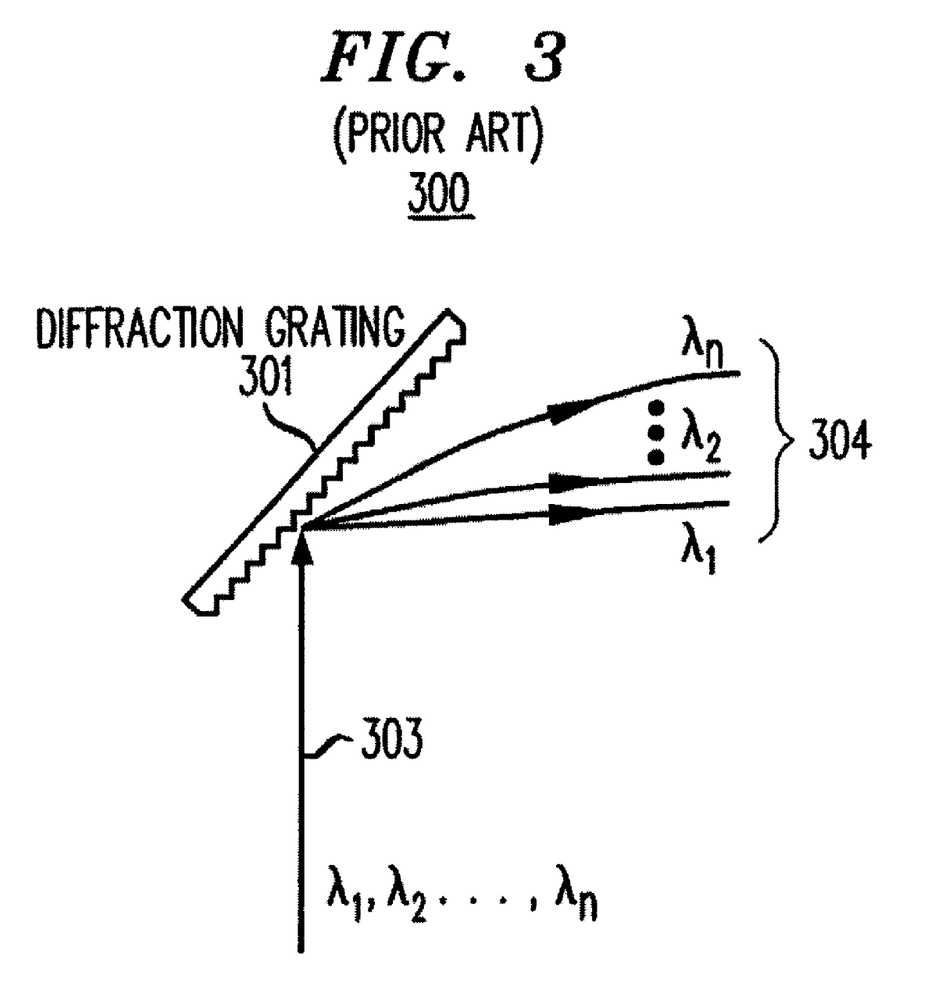
FIG. 3 shows a typical prior art free-space diffraction grating.

Similarly, FIG. 3 shows a prior art free-space diffraction grating used as a demultiplexer. Demultiplexer 300 comprises diffraction grating 301 receiving input WDM signal 303 having N channels ($\lambda_1 \lambda_2 \ldots \lambda_N$) and producing an array of N single wavelength signals 304.

To help better understand the principles of the invention, a few terms will be defined in this and the next several paragraphs. The channel spacing, $\Delta f$, between two neighboring channels in a WDM signal is the frequency difference between them. In the following discussion, the channel spacing is assumed to be constant unless otherwise specified. The channel span is the difference between the highest frequency and the lowest frequency of the wavelengths in a WDM signal. When the channel spacing is a constant, the channel span is the product of the number of channels and the channel spacing, $N\Delta f$.

Figure 4:
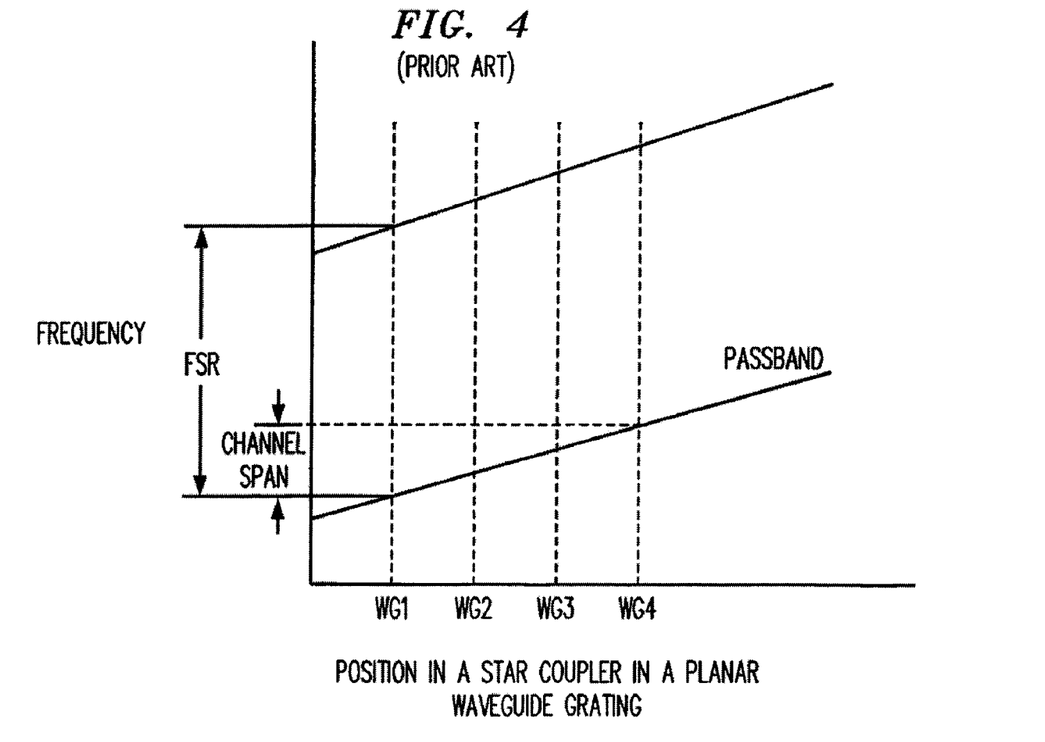
FIG. 4 shows the relationship between the free spectral range and the channel span of a prior art planar waveguide grating.

The free spectral range (FSR) of a grating is the spectral range between two successive passbands of the grating and is generally a constant. For example, FIG. 4 shows the FSR of a prior art planar waveguide grating such as the one shown in FIG. 2. As can be observed from FIG. 4, the FSR is greater than the channel span.

The grating order, A, for a grating, such as a free-space diffraction or a planar waveguide grating, is an integer that satisfies the grating equation (as known in the art). Generally, for either type of gratings, the grating order, A, can be calculated as follows:

$$A = f/2N\Delta f, \quad (1)$$

where f, $\Delta f$, and N are the center frequency, the channel spacing, and the number of channels of the input WDM signal, respectively.

The elements per length, G, of a grating is the number of grooves per length for a free-space diffraction grating and the number of inlets or ports per length along the star coupler boundary for a planar waveguide grating.

In a WAD and as known in the art, assuming a diffraction angle of 0.1 radian, the minimum distance, $d_{gc}$, between the gratings and the control array of the WAD is:

$$d_{gc} = f/(0.1 G \Delta f An), \quad (2)$$

where f is the center frequency of the channel span, G is the elements per length of the gratings, A is the grating order, and n is the index of refraction in the material between the gratings and the control array. Generally, the larger the $d_{gc}$, the larger the physical size of a WAD.

It can be observed from Eq. (1) that when the number of channels, N, increases, the grating order decreases and from Eq. (2) that when the grating order decreases, the distance between the gratings and the control array increases. Thus, generally, when the number of channels in a WDM network increases, the physical size of the requisite WADs also increases. In general, the larger the physical size of a WAD, the more the cost and the insertion loss. Such large WAD devices are expensive, lossy, and difficult to qualify in thermal and shock tests.

Figure 5:
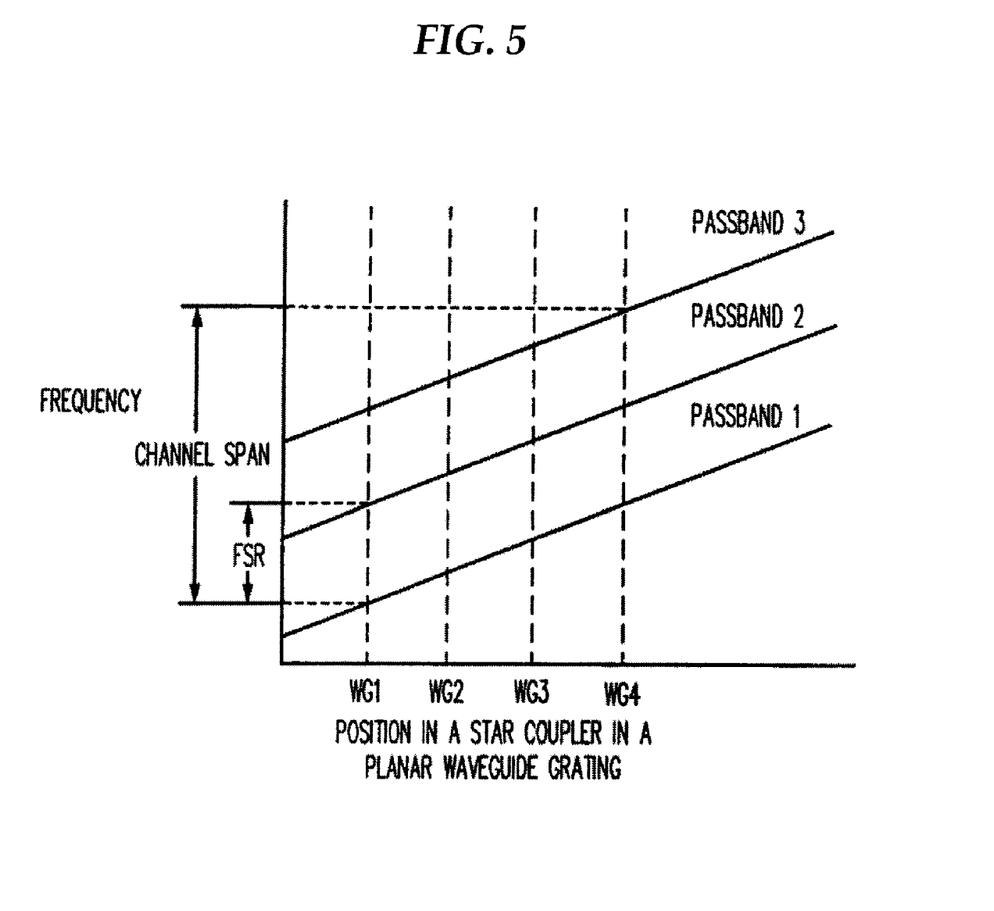
FIG. 5 shows the relationship between the free spectral range and the channel span of a planar waveguide grating used in constructing a wavelength filter in accordance with the principles of the invention.

However, and in accordance with the principles of the invention, the number of channels supported by a WAD can be increased without a concomitant increase in physical size. In particular, if the FSR of a grating is smaller than the channel span of the input or the output WDM signal, channels are operated on in sets (where at least one set contains more than one channel.) The number of channels in a set may or may not be a constant. FIG. 5 illustrates the effect of having the FSR smaller than the channel span. In FIG. 5, each waveguide has three passbands within the channel span. Thus, each waveguide can be shared by three channels. As a result, fewer waveguides are needed to support a given number of channels. Advantageously, the length of the WAD decreases as well. The decrease in length can be observed from Eq. (1) where the number of channels, N, is replaced by the number of sets, M, and since M is less than N, the grating order A increases, which causes the minimum length $d_{gc}$ in Eq. (2) to decrease. Thus, the physical size of the WAD decreases, resulting in higher channel density, i.e., more channels per unit physical size. Given the channel spacing $\Delta f$ and the number of sets M, the FSR required for a grating is $M\Delta f$. Once an FSR value is determined, the design and construction of a grating is known in the art and is not described herein.

Figure 6:
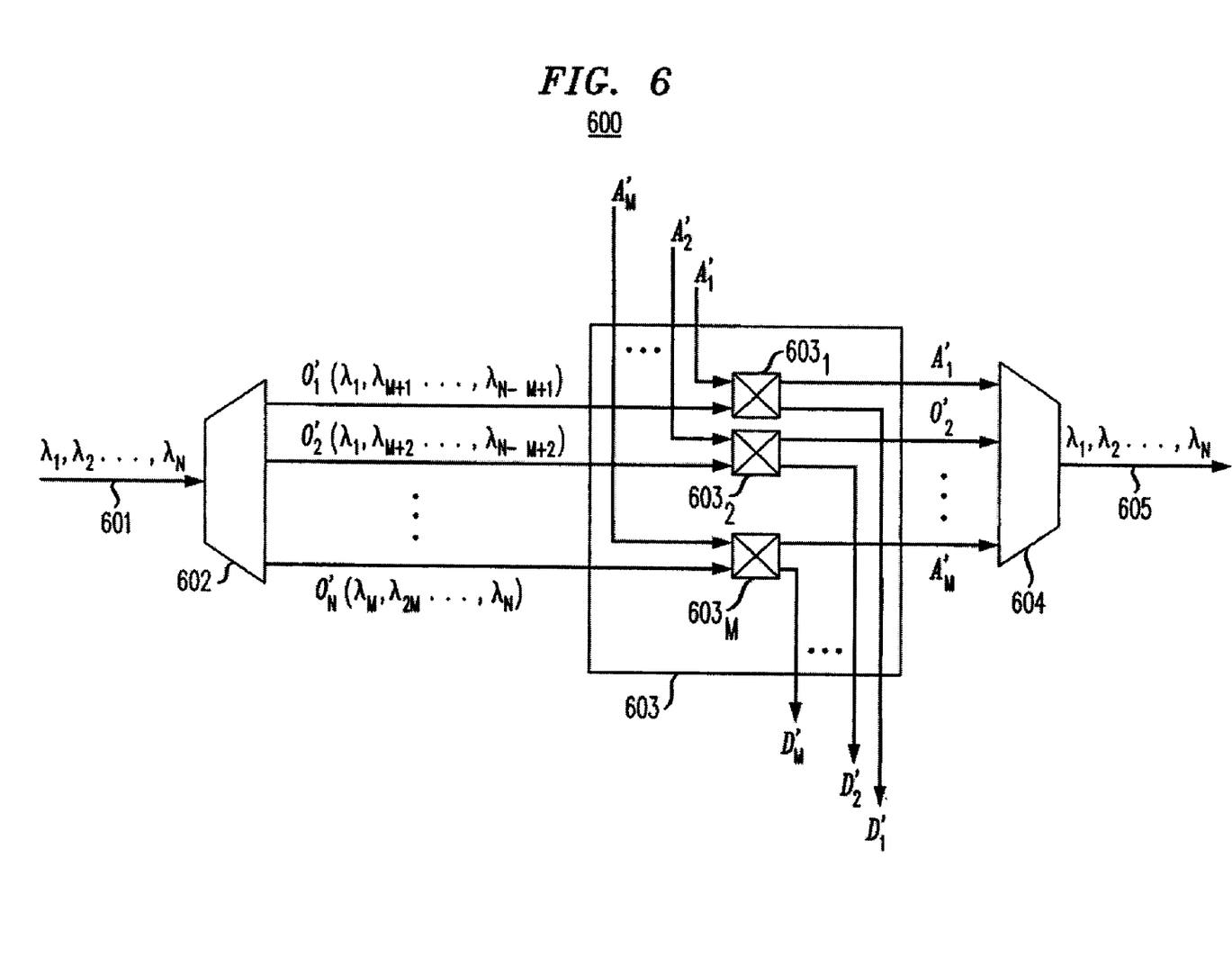
FIG. 6 shows an exemplary wavelength add/drop multiplexer in accordance with the principles of the present invention.

FIG. 6 shows an exemplary wavelength add/drop multiplexer in accordance with the principles of the invention. As can be observed from FIG. 6, WAD 600 operates on channels in sets and at least one set contains more than one channel. In this example, there are M sets in FIG. 6 and each set contains N/M channels where M<N, and M is preferably a factor of N. WAD 600 comprises demultiplexer 602, control array 603, and multiplexer 604. Demultiplexer 602 demultiplexes input WDM signal 601 having N different channels ($\lambda_1 \lambda_2 \ldots \lambda_N$) into M demultiplexer output signals $O'_1$-$O'_M$, each of which has N/M channels. An add signal $A'_i$ or a drop signal $D'_i$ in this example has N/M channels ($\lambda_i \lambda_{M+i} \lambda_{2M+i} \ldots \lambda_{N-M+i}$). Control array 403 comprises M contro Advantageously, fewer control elements than the number of channels, N, are needed in WAD 600 since each control element controls more than a channel. Each control element receives a demultiplexer output signal and an add signal, and provides a drop signal and a control array output signal, all associated with the same set of channels. For example, control element $603_1$ receives demultiplexer output signal $O'_1$ and add signal $A'_1$, and provides drop signal $D'_1$ and a control array output signal, all associated with the set of N/M channels ($\lambda_1 \lambda_{M+1} \lambda_{2M+1} \ldots \lambda_{N-M+1}$). In this example, WAD 600 provides tw signals, $A'_1$ and $A'_M$, and M−2 demultiplexer output signals, $O'_2$-$O'_{M-1}$, as the control array output signals shown in FIG. 6. Multiplexer 604 multiplexes the control array output signals into an output WDM signal 605 having N channels.

Figure 7:
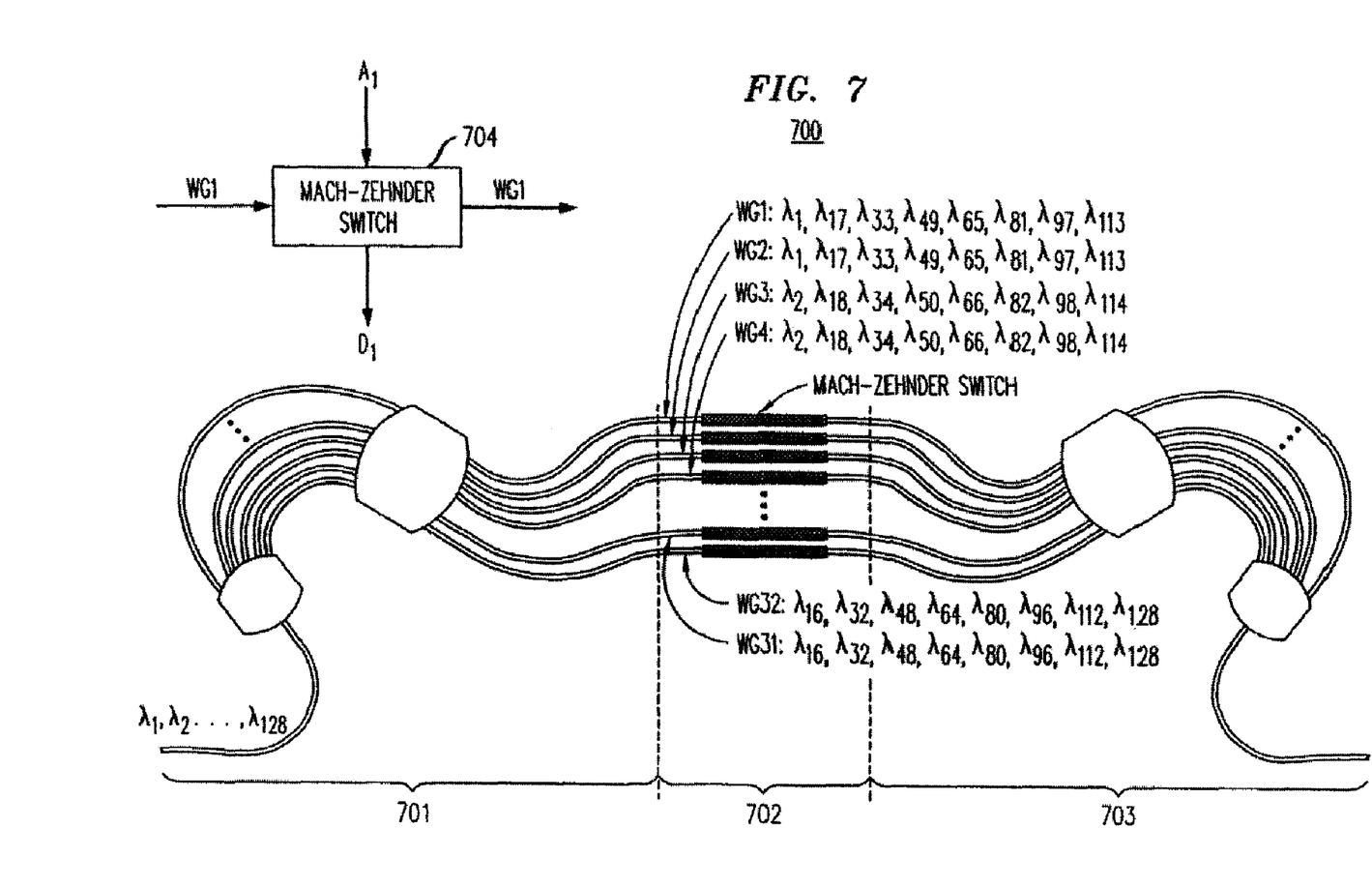
FIG. 7 shows an exemplary wavelength add/drop comprising planar waveguide gratings in accordance with the principles of the present invention.

One way of constructing a WAD in accordance with the principles of invention is with a planar waveguide grating. This is shown in FIG. 7. WAD 700 comprises demultiplexer 701, multiplexer 703, and control array 702, which comprises a number of equal-length waveguides, each associated with a Mach-Zehnder switch. Both demultiplexer 701 and multiplexer 703 use a planar waveguide grating. (It should be noted that the gratings for demultiplexer 701 and multiplexer 703 need not be the same.) The detailed connections to a Mach-Zehnder switch is shown in 704 using the Mach-Zehner switch associated with equal-length waveguide $WG_1$ as an example, where $A_1$ and $D_1$ are respectively the add signal and the drop signal associated with the same set of channels with which equal-length waveguide $WG_1$ is associated. Similarly, $WG_2$ is associated with another add signal, drop signal, and Mach-Zehner switch. WAD 700 supports 128 channels ($\lambda_1 \lambda_2 \ldots \lambda_{128}$) separated into 16 sets, each set contains 8 channels. Thus, demultiplexer 701 produces 16 demultiplexer output signals, each of which has 8 channels. Another feature of WAD 700 is that each demultiplexer output signal is carried by two equal-length waveguides. The two Mach-Zehner switches associated with the two equal-length waveguides carrying the same demultiplexer output signal work in concert to pass or block the demultiplexer output signal. This multiple equal-length waveguides per signal arrangement is shown in FIG. 7 where, for example, equal-length waveguides, $WG_1$ and $WG_2$, carry a demultiplexer output signal of 8 channels ($\lambda_1 \lambda_{17} \lambda_{33} \lambda_{49} \lambda_{65} \lambda_{81} \lambda_{97} \lambda_{113}$), and $WG_{31}$ and $WG_{32}$ carry a demultiplexer output signal of another 8 channels ($\lambda_{16} \lambda_{32} \lambda_{48} \lambda_{64} \lambda_{80} \lambda_{96} \lambda_{112} \lambda_{128}$), etc. (Although illustrated with two, more equal-length waveguides can be used to carry a demultiplexer output signal.) The advantage of having more than one waveguide to carry a demultiplexer output signal is that the individual passbands are flat for each channel and the entire response is completely flat when no channels are dropped or added. It can be shown that WAD 700 has a resulting length of about 11 cm in typical silica waveguides. This compares favorably to a minimum length of about 14 cm and 52 cm for a prior art WAD supporting the same number of channels for a planar waveguide grating and a free-space diffraction grating, respectively.

As discussed earlier, if free-space diffraction gratings are used, no equal-length waveguide is needed, and mirrors and liquid crystals are used as control elements (not shown). To create a similar effect of using multiple equal-length waveguides per signal in the planar waveguide grating case, a larger mirror should be used when free-space diffraction gratings are used.

Now, turn to the design of another useful wavelength filter, the wavelength blocker, implemented with the principles of the invention. The design principle for a wavelength blocker is similar to that of a WAD, and the resulting physical size would be smaller if similar gratings were used because no add or drop signals are involved. A wavelength blocker is used to block (discard) signals in some or all channels of a WDM signal. A wavelength blocker can be used to build a WAD, a switch, or other wavelength filters. As an example of the similarity in designing a wavelength blocker in accordance with the principles of the invention, WAD 700 in FIG. 7 becomes a wavelength blocker when the Mach-Zehnder switches in control array 702 are replaced with Mach-Zehnder interferometer shutters. Other shutters can be used as well. The resulting length of the wavelength blocker can be shown to be about 6 cm. This wavelength blocker is called a one-pass wavelength blocker because light goes through the shutters only once. This one-pass wavelength blocker is used in the following two examples to illustrate that a one-pass wavelength blocker can be used as a building block for other types of wavelength filters.

Figure 8:
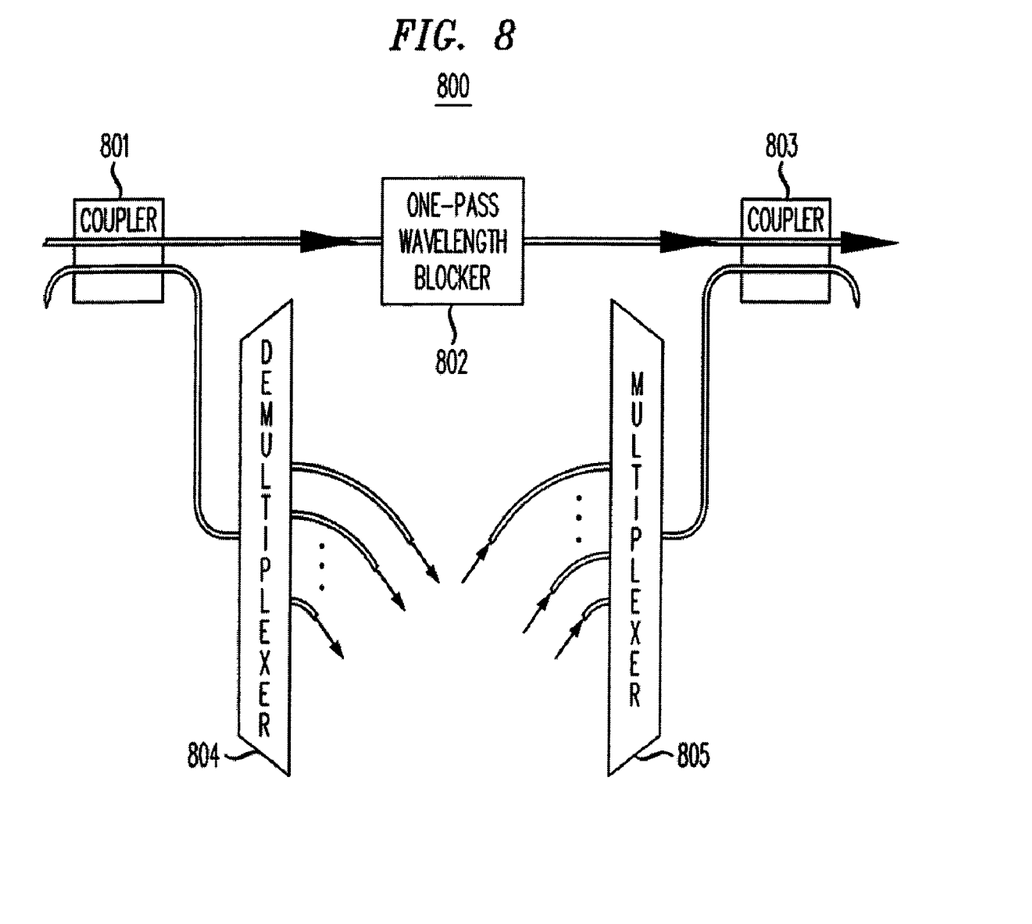
FIG. 8 shows a wavelength add/drop multiplexer constructed from a one-pass wavelength blocker.

FIG. 8 shows an example of using the one-pass wavelength blocker discussed in the previous paragraph to build a WAD. WAD 800 comprises couplers 801 and 803, the one-pass wavelength blocker 802, demultiplexer 804, and multiplexer 805. Coupler 801 couples the input WDM signal to demultiplexer 804, which drops signals from some or all of the channels. The one-pass wavelength blocker 802 blocks signals in some or all sets of channels, so that multiplexer 805 can add new signals to those sets of channels.

Figure 9:
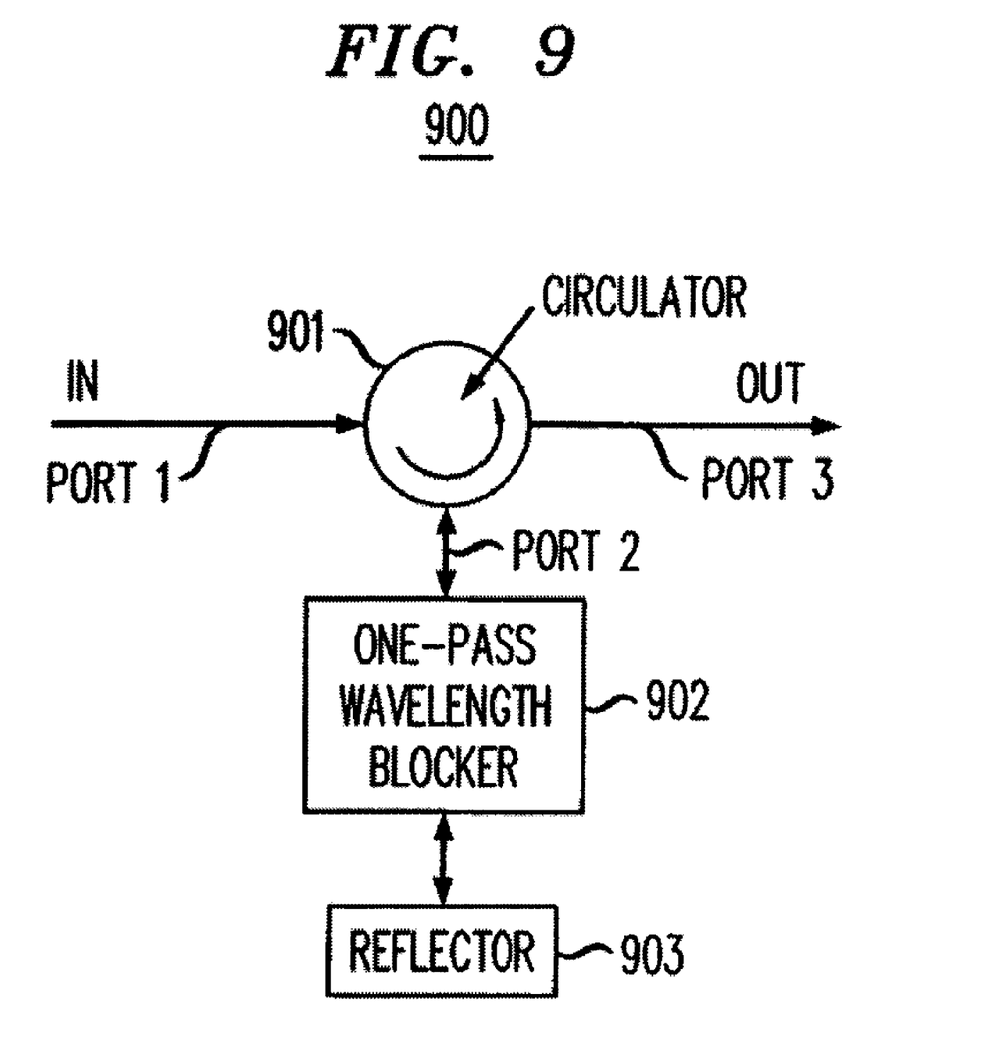
FIG. 9 shows an exemplary two-pass wavelength blocker constructed from a one-pass wavelength blocker.

FIG. 9 shows an example of building a two-pass wavelength blocker from the one-pass wavelength blocker described above. Two-pass wavelength blocker 900 comprises one-pass wavelength blocker 902, circulator 901, and reflector 903. Port 1 of circulator 901 receives an input WDM signal and passes the input WDM signal to one-pass wavelength blocker 902 through port 2 of circulator 901. One-pass wavelength blocker 902 blocks zero or more sets of channels and passes the remaining sets as an output WDM signal. Reflector 903 reflects the output WDM signal back into one-pass wavelength blocker 902. One-pass wavelength blocker 902 passes the reflected output WDM signal to port 2 of circulator 901. Circulator 901 provides the reflected output WDM signal on port 3. Reflector 903 is a mirror, preferably a Faraday mirror. Similarly, a two-pass WAD can be constructed from a one-pass WAD in accordance with the principle of the invention (not shown).

High channel density wavelength filters that switch wavelength channels in sets other than those shown can be implemented using the teachings of the present invention. Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention.

What is claimed is:

1. An optical device for demultiplexing an input WDM signal into a plurality of output signals, the optical device comprising:
   a single input waveguide;
   a plurality of output waveguides, and
   a grating having a free spectral range smaller than a wavelength channel span of the input WDM signal, said grating including an input coupler, an output coupler, and an array of unequal-length waveguides connecting the input and output couplers, wherein the input and output couplers are respectively connected to the input waveguide and the plurality of output waveguides,
   characterized in that;

upon receiving the input WDM signal at the input waveguide the optical device demultiplexes the input WDM signal into the plurality of output signals, wherein each output signal has multiple channels each one at a different wavelength, and wherein each output signal is carried by a respective plurality of in-concert output waveguides, such that each output signal is not carried by output waveguides other than its respective in-concert output waveguides.

2. The optical device of claim 1 wherein the number of wavelengths in each output signal is the same.

3. An optical device for producing an output WDM signal by multiplexing a plurality of input signals, the optical device comprising:

a plurality of input waveguides;

a single output waveguide, and a grating having a free spectral range smaller than a wavelength channel span of the output WDM signal, said grating including an input coupler, an output coupler, and an array of unequal-length waveguides connecting the input and output couplers, wherein the input and output couplers are respectively connected to the plurality of input waveguides and the output waveguide, characterized in that each input signal has multiple channels each one at a different wavelength, and wherein each input signal is carried by a respective plurality of in-concert input waveguides, such that each input signal is not carried by input waveguides other than its respective in-concert input waveguides.

4. The optical device of claim 3 wherein the number of wavelength in each input signal is the same.

* * * * *